March 14, 1950   J. S. DUFFY   2,500,277
UNIVERSAL COUPLING
Filed June 20, 1947   3 Sheets-Sheet 1

Inventor:
Joseph S. Duffy
By Wallace and Cannon
Attorneys

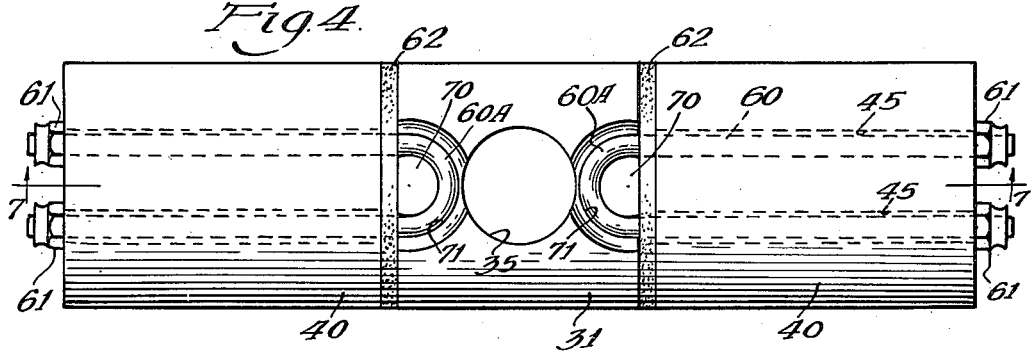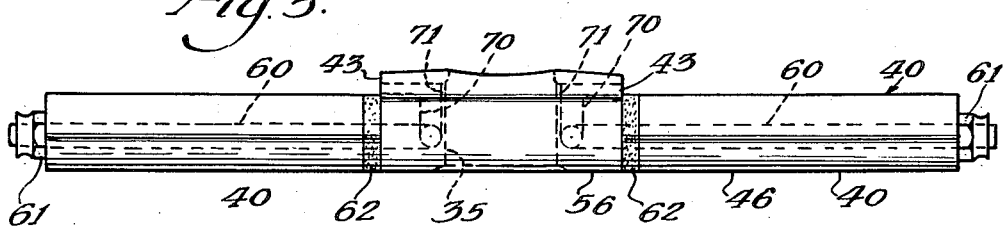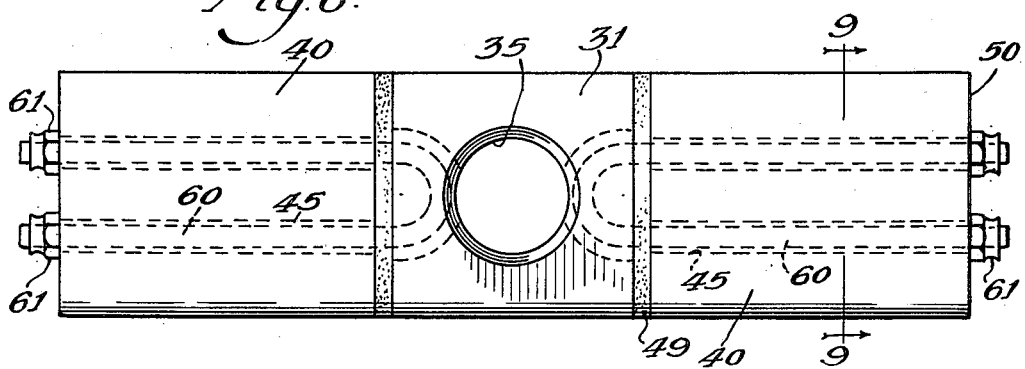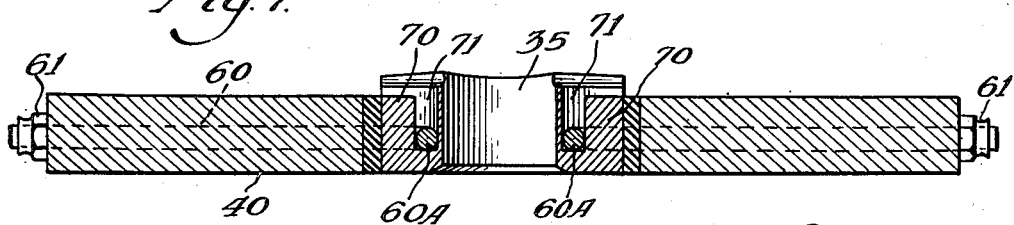

March 14, 1950 J. S. DUFFY 2,500,277
UNIVERSAL COUPLING
Filed June 20, 1947 3 Sheets-Sheet 3
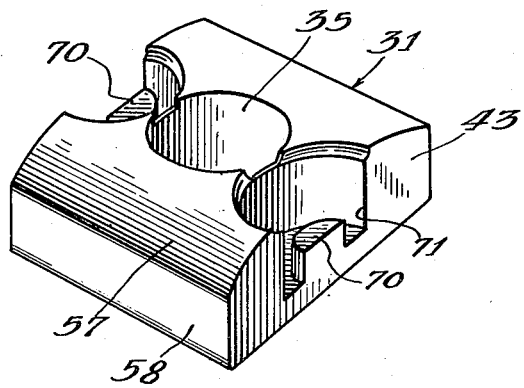
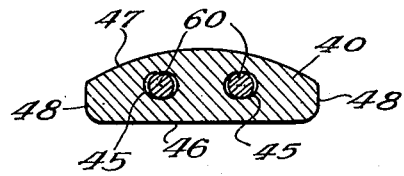
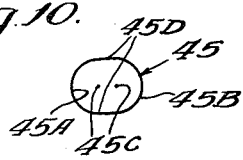
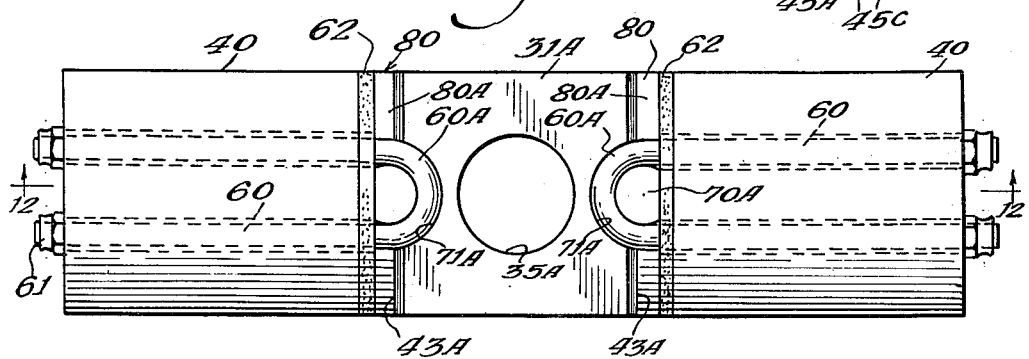
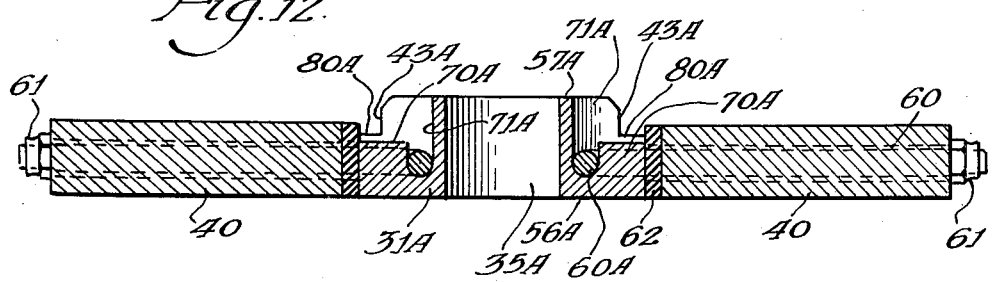
Inventor:
Joseph S. Duffy
By Wallace and Cannon
Attorney Patented Mar. 14, 1950

2,500,277

UNITED STATES PATENT OFFICE 2,500,277

UNIVERSAL COUPLING

Joseph S. Duffy, Baltimore, Md., assignor to American Brake Shoe Company, Wilmington, Del., a corporation of Delaware Application June 20, 1947, Serial No. 755,933

12 Claims. (Cl. 64—7)

This invention relates to bearings and particularly to slipper bearings for universal couplings and the like.

In the transmission of rotative mechanical power it often occurs that the driving and driven shafts are arranged in an end-to-end relationship with the axes of the two shafts displaced in an angular sense, and under such circumstances it is necessary that the two shafts be interconnected by a universal coupling so as to enable a continuous driving connection to be maintained between the shafts despite the angular relationship of the axes thereof. Many different kinds of universal couplings are of course available, but where the torque loads that are to be encountered are relatively large it is often found to be advisable to employ a universal coupling wherein the load transmission is effected through what have come to be known as slipper bearings. In this form of universal coupling, cooperating male and female members are formed respectively on or are secured to the adjacent ends of the two shafts that are to be drivingly connected, the male member including a longitudinally projecting flat tongue or fishtail which is inserted into a bifurcation that is afforded in the end of the female member of the coupling. The branches or arms of the bifurcated female member are arcuately recessed transversely thereof and such recesses are so located as to be disposed in opposing but spaced relation to the opposite side faces of the tongue when the tongue is inserted into the bifurcation. When this relationship exists, the arcuate recesses and the opposed surfaces of the tongue define a pair of semi-cylindrical pockets providing concentric arcuate bearing surfaces located on opposite sides of the tongue and in spaced relation thereto. Each of these pockets or recesses serves to receive a slipper bearing, and each such slipper bearing has a convex bearing surface that conforms with the arcuate bearing surfaces of the recess, and each such slipper bearing also has a flat bearing face that conforms to the adjacent flat face of the tongue. A bearing pin is arranged so as to extend between the slipper bearings that are disposed in the opposite pockets of the coupling, the tongue having an opening or slot through which the bearing pin extends, and the bearing pin is shouldered in most instances so as to maintain the two slipper bearings in spaced relationship. The bearing pin also serves to afford one of the axes of the universal coupling, the other axis being afforded by the arcuate surfaces of the female member.

Intermediate the ends of the slipper bearings it is customary to provide a retaining boss that has an opening therein that serves as a socket to receive the end of the bearing pin, and such bosses are of greater thickness than the end portions of the bearing so that these bosses may ride in arcuate groove portions of the female member that are concentric with but are somewhat deeper than the aforesaid arcuate bearing surfaces. With this arrangement, the bosses engage the sides of these deeper recesses or grooves so as to hold the slipper bearings against endwise displacement with respect to the female member of the coupling.

In universal couplings of the aforesaid character, it is well known that the major portion of the wear on the slipper bearings and upon the opposed bearing surfaces takes place adjacent to the ends of the slipper bearings, or in other words, at the maximum distance from the center lines of the two connected shafts, and this condition has a tendency to cause breakage of the slipper bearings which necessitates replacement of at least certain portions of the slipper bearings. In the prior Healy Patent No. 2,305,696, patented December 22, 1942, there is disclosed and claimed a slipper bearing arrangement wherein each slipper bearing is made from three separably related parts and these parts are so constructed and arranged that the end sections of the slipper bearings may be removed from the coupling without disconnection of the coupling, thereby to enable quick replacement of the end sections which become worn in the course of use of such slipper bearings.

The need for replacement of such end sections of a slipper bearing may of course arise by reason of wear on such end sections of the slipper bearings, or in other instances the need for replacement may arise by reason of breakage of such end sections in the rough usage that is encountered, and in the prior Healy Patent No. 2,305,697, patented December 22, 1942, a slipper bearing construction is disclosed wherein the end sections may pivot with relation to the boss section of the slipper bearing, thereby to enable the end sections to conform with the opposed surfaces of the coupling without a tendency to break or otherwise damage such end sections.

The characteristics of removability of the end sections of such slipper bearings and the ability of such end sections to pivot or otherwise shift relative to the boss sections thereof have been found to be highly desirable in the use of universal couplings of the aforesaid character, and it is an important object of the present invention to enable these characteristics to be attained in a slipper bearing by means that are extremely simple in character and which are of a rugged construction that will withstand the severe impacts and forces that are encountered in the use of slipper bearings of this kind. A further object of the invention is to enable slipper bearings to have the end sections thereof attached to the boss section by means that are not subject to breakage when pivotal movement of the end sections takes place.

Other and further objects of the present invention will be apparent from the following description and claims are illustrated in the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 4 is a plan view of one form of slipper bearing embodying the present invention;

Fig. 5 is a side elevational view of the slipper bearing shown in Fig. 4;

Fig. 6 is a bottom plan view of the slipper bearing;

Fig. 7 is a longitudinal sectional view of the slipper bearing taken substantially along the line 7—7 of Fig. 4;

Fig. 8 is a perspective view of the boss section of the slipper bearing shown in Figs. 3 to 7;

Fig. 9 is a transverse sectional view taken substantially along the line 9—9 of Fig. 6;

Fig. 10 is a diagrammatic view showing the form of the openings in the end sections;

Fig. 11 is a plan view of an alternative embodiment of slipper bearing constructed in accordance with the present invention; and Fig. 12 is a longitudinal sectional view taken substantially along the line 12—12 of Fig. 11.

Figure 1:
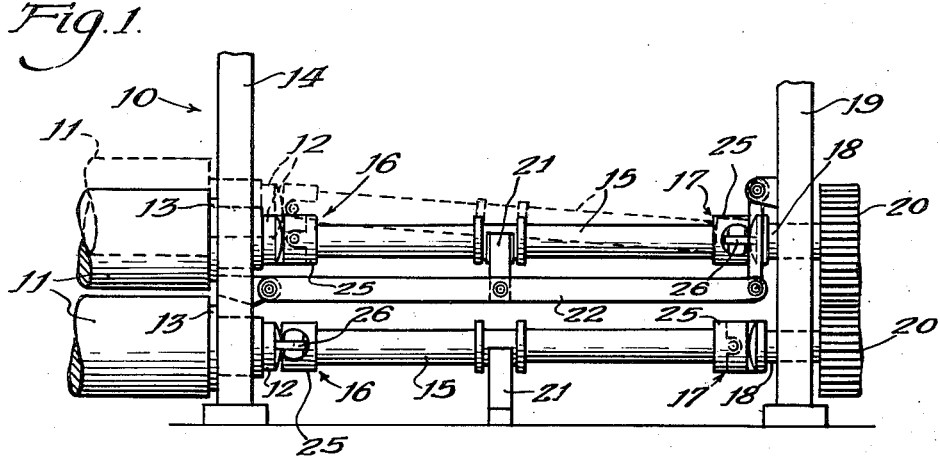
Fig. 1 is a fragmental elevational view of the driving portion of a rolling mill equipt with bearings embodying the present invention.

Slipper bearings of the character to which the present invention relates are commonly employed in the drives for the continuous type of steel rolling mills and the like, such as the mill 10 that is fragmentally illustrated in Fig. 1. The rolling mill 10 comprises a pair of opposed rolls 11 having reduced end portions or pintles 12 journaled in bearings 13 carried by an upstanding frame member as 14, and these pintles 12 are connected by universal couplings 16 to the ends of drive spindles 15. The other ends of the spindles 15 are connected by universal couplings 17 to stub shafts 18 journaled in an upstanding frame member 19, gearing 20 being carried by the stub shafts 18 for connecting these shafts to the driving means (not shown). To afford adjustability of the rolls 11 in accordance with the thickness of the material that is to be worked upon, the bearings as 13 are arranged to be vertically positioned at selected points in the frame member 14. Thus the upper roll 11 may be adjusted from the fullline position shown in Fig. 1 to accommodate a greater thickness of material, thus causing the upper spindle 15 to assume the position indicated by broken lines so that this spindle 15 is angularly disposed with respect to the associated pintle 12 and stub shaft 18. The lower spindle 15 is supported midway between its ends by a thrust or spindle carrier bearing 21 which is supported in any suitable manner. The upper spindle 15 is carried by a spindle carrier bearing 21 which is mounted on a linkage 22 attached to the bearing 13 of the upper roll 11, and as the position of the upper spindle 15 is changed in the manner just described the bearing 21 thereof is correspondingly repositioned so that it may continue to support this spindle.

The universal couplings 16 and 17 which interconnect the spindles 15 with the rolls 11 and stub shafts 18 afford driving connections between these various rotatable members even though they are not longitudinally aligned with each other. As shown in detail in Figs. 2 and 3, each universal coupling comprises a female member 25 which is formed on or secured to an end of a spindle as 15, Fig. 1, and a male member 26 which is provided on the adjacent end of an associated stub shaft as 18 or a pintle as 12. The male member 26 is in the form of a flat tongue that may be inserted into a bifurcation that is formed in the female member 25 so as to form spaced arms or branches 25A and 25B that extend endwise of the female member 25. Arcuate or cylindrical recesses 27, Figs. 1 and 2, are formed in the branches 25A and 25B of the bifurcation in the female member 25 and extend transversely with respect to the free edges thereof, and deeper recesses 28 concentric with the recesses 27 are afforded in the member 25 between the free ends of the semi-cylindrical openings defined by the recesses 27.

Figure 2:
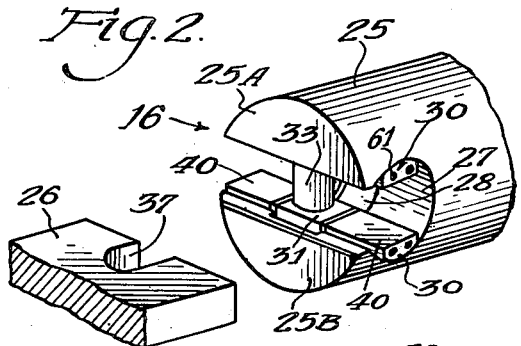
Fig. 2 is a fragmental perspective view of a universal coupling in partially disassembled condtion and showing the manner in which one form of my novel slipper bearing structure is embodied in the coupling.
Figure 3:
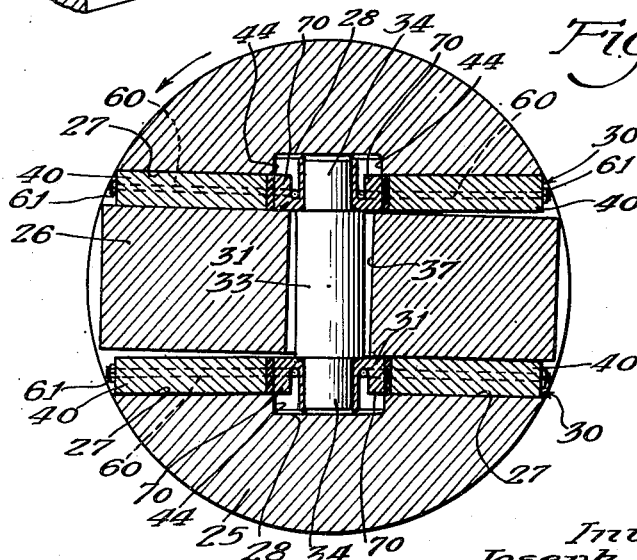
Fig. 3 is a transverse cross sectional view of the universal coupling shown in Fig. 2.

A pair of slipper bearings 30, constituting one embodiment of the invention, are respectively interposed between the tongue 26 and the arcuate recesses in the branches of the bifurcation in the female member 25, as shown in Figs. 2 and 3, each such slipper bearing 30 having flat and convex surfaces opposite faces thereof to conform respectively with the tongue 26 and the semicylindrical recesses in the female member 25. The medial or boss portion 31 of each slipper bearing 30 is of greater thickness than the end sections 40 of the bearing and these bosses 31 seat in the deeper recesses 28 while the end sections 40 are seated in the recesses 27. The bosses 31 of the slipper bearings 30 are interconnected and maintained in spaced relation with each other by a shouldered bearing pin 33 having reduced end portions 34 which are received in socket openings as 35, Fig. 4, in these bosses, the pin 33 passing through a suitable slot or other opening 37 in the tongue 26.

Where the shafts which are interconnected by a universal coupling 16 or 17 are not axially aligned, as is the case when the upper spindle is in the broken-line position thereof shown in Fig. 1, the slipper bearings 30 are rocked back and forth in their recesses 27 and 28, Figs. 2 and 3, and the tongue rocks about the axis of the pin 33, as the angular position of the tongue 26 with respect to the female member 25 changes in the course of rotation of these parts. However, longitudinal movement of the slipper bearings 30 is prevented by the end faces 43 of the bosses 31 which are engaged by the shoulders 44, Fig. 3, intermediate the recesses 27 and 28 in the female member. Thus, the tongue 26 may pivot about two axes, one being afforded by the bearing pin 33, and the other by the generally cylindrical or concentric surfaces of the recesses 27 and 28 in which the slipper bearings are seated.

As is indicated in somewhat exaggerated fashion in Fig. 3, the rotative force or reaction exerted by the tongue 26 upon each slipper bearing 30 is borne substantially entirely by only one of the end sections 40 of each such bearing in instances where the direction of rotation remains substantially constant. These heavily stressed end sections 40 of the slipper bearings 30 and the cooperating portions of the female member 25 undergo a relatively rapid rate of wear, and this wear is greatest on both of the opposed surfaces adjacent to the ends of the slipper bearings. As the support for such end sections becomes weakened due to changes in the configuration of the mating surfaces there is a tendency for these end sections to bend relative to the bosses 31 of the slipper bearings, particularly when these bosses are firmly seated in the recesses 28, and as stated hereinabove, it is an important purpose of the present invention to enable such bending movement and relative readjustment of the more heavily stressed end sections 40 to take place without unduly straining the slipper bearing assembly.

In accordance with the present invention, the end sections 40 of the slipper bearings are detachably associated with the boss section 31, and this is accomplished in such a way as to enable these end sections to pivot and move relative to the boss section so as to thereby permit proper transmission of the rotative driving forces while preventing building up of undue strains on or in the parts of the slipper bearing. In accomplishing such a relationship between the end sections 40 and the boss section 31 of the slipper bearing, the end sections 40 are formed and arranged substantially in the manner disclosed in the aforesaid Healy Patent No. 2,305,696, in that these end sections have longitudinal openings 45 formed therethrough so that fastening means may be extended from the boss section 31 through the openings 45. As will be evident in Figs. 4 to 7 and 9, each end section 40 is substantially rectangular in form and has a flat surface 46 on one face thereof adapted to bear against the flat face of the tongue 26, while on the opposite face of the end section an arcuate bearing surface 47 is provided that is adapted for cooperation with the arcuate bearing surface 27 of the female member 25 of the coupling. In the present instance the two bearing surfaces 46 and 47 are joined by edge surfaces 48, and the surfaces 46, 47 and 48 terminate at opposite end surfaces 49 and 50 of the end section. In the assembled slipper bearing, the end surface 49 of each end section 40 is disposed adjacent to an end surface of the boss section 31, and each such end section is held in position with respect to the boss section 31 by fastening means that are extended through the openings 45 in a manner that will be explained presently.

In accomplishing the objectives of the present invention, the boss section 31, as illustrated in Figs. 4 to 8 is constructed so as to be generally rectangular in form, and the boss section is of the same width as the end sections 40. The boss section 31 has a flat bearing surface 56 that is adapted to bear against the flat surface of the tongue 26, and on its opposite face, the boss has an arcuate bearing surface 57 that is adapted for cooperation with the arcuate bearing surface or groove 28. The opposite edges of the bearing surfaces 56 and 57 are joined by side edge surfaces 58, while the end edge surfaces are afforded as continuations of the surfaces 43 that have been referred to hereinabove. It will be evident that the thickness of the boss section 31 is considerably greater than the thickness of the end sections 40 so that when the flat surfaces 46 of the end sections 40 are disposed in the plane of the flat bearing surface 56 of the boss, as shown in Figs. 5 and 7, the end edges 43 of the boss extend above the surfaces 47 to thereby afford shoulders or abutments for engagement with the sides 44 of the retaining groove 28. The bearing opening 35 is in the form of a bore that is extended through the boss section 31 perpendicular to the surface 56 and midway between the opposite end surfaces 43 of the boss section.

In securing the end sections 40 in position at opposite ends of the boss section 31, the present invention provides not only for removability of the end sections 40 without disassembly of the coupling, but also for relative movement of the end sections with respect to the boss section 31 when driving forces are applied to the coupling. Such association of the end sections 40 with the boss section 31 is under the present invention accomplished by means that are rugged in character, and such means comprise, with respect to each of the end sections 40, a connecting member 60 in the form of a U-bolt having parallel arms that are connected by an integral arcuate portion 60A. The parallel arms of the connecting member 60 are adapted to extend through the parallel openings 45 of the end section 40 and fastening nuts 61 are put in place on the screw threaded ends of the arms of the connecting member 60 so that the end section is held removably in place on the parallel arms of the fastening device 60. The assembly that is thus provided is associated with the boss section 31 by affording pivotal connecting means on the boss section 31 for cooperation with the arcuate cross member 60A, and when the cross member 60A is thus associated with pivotal fastening means on the boss section 31, the nuts 61 may be tightened so as to draw end section 40 into firm association with the adjacent end of the boss section 31. In attaining such association however it is important that provision be made for permitting relative shifting movement of the end section 40 with respect to the boss section 31, and this is facilitated through the use of a resilient spacer block 62 made from a material such as rubber and corresponding in form and function with the resilient spacer block 62 shown in the Irvin Patent No. 2,305,702, patented December 22, 1942.

In providing the desired pivotal connection for the connector member 60, the boss section 31 is arranged to afford a stud 70 adjacent each end of the boss section extended along an axis that is perpendicular to the flat bearing surface 56 of the boss section. In affording each stud 70 in the present embodiment of the invention, the boss section is cut away as will be evident in Figs. 4, 7 and 8 to afford an arcuate recess 71 that surrounds the stud 70 and is defined on its inner surface by the stud 70, thereby to form the stud 70 as an integral part of the boss section. The arcuate recess 71 is of such a width that it will receive the arcuate connecting portion 60A of the connecting member 60, and the depth of the arcuate recess 71 is such that when the connecting portion 60A is put in place and is rested against the bottom surface of the arcuate recess, the surface 46 of the end section will be disposed in substantially the plane of the flat bearing surface 56 of the boss section. It will be recognized of course that the surface of the stud 70 that defines the inner side of the arcuate recess 71 is formed as a portion of a cylindrical surface, the radius of which is the same as the inner radius of the connecting portion 60A of the connecting member 60, and by this arrangement, an effective pivotal connection is afforded between the connecting member 60 and the stud 70 whereby the connecting member 60 may pivot about the longitudinal axis of the stud 70, and the end section may also pivot relative to the boss section about an axis parallel to the bottom surface 56. It will be recognized of course that the width of the arcuate groove 71 is so related to the maximum diameter or dimension of the connecting portion 60A as to allow the aforesaid pivotal movement to take place as required. In this regard, it should be noted that the resilient spacer member 62 will be compressed at one end or the other or at the edges thereof as an incident to any such pivotal movement of the connector member 60, for such pivotal movement will of course be induced by forces applied to the end section 40, and the action of the spacer member 62 is therefore such as to limit such pivotal movement. Moreover, the resilient member 62 tends to restore the parts to their original position or relationship when the forces that have induced pivotal movement are removed.

The connecting portion 60A of the connecting member 60 is of course freely movable within the recess 71 in a direction that is longitudinal with respect to the axis of the stud 70, and hence the connection that is afforded under the present invention between the end section 40 and the boss section 31 also enables pivotal movement of the boss section on an axis that is parallel to the intersection of the surfaces 43 and 56 of the boss section, and this enables the boss section to conform with the bearing surfaces of the connected members of the coupling.

As a further means for enabling the necessary relative movements of the parts to take place, the longitudinal openings 45 in the end sections 40 are so formed that limited movement of the end sections with relation to the arms of the connector member 60 may take place in a direction that is parallel to the surface 46 of the end section and perpendicular to the axis of the arms of the connector member 60. Thus as will be evident in Fig. 10, the longitudinal openings 45 are formed by two semi-cylindrical or arcuate surfaces 45A and 45B, the centers 45C of which are spaced a substantial distance apart, and these arcuate or semi-circular surfaces 45A and 45B are joined by flat surfaces 45D that are parallel to each other and parallel to the flat surface 46 of the end section. This enables lateral movement of the arm of the connector member 60 within such opening 45 over a lateral range that is equal to the spacing of the two centers 45C. Thus in the mounting of the end sections 40 on the slipper bearing, the spacing of the two arms of the connector member 60 is not particularly critical, and in the operation of the slipper bearing in a coupling, the end sections may move laterally of the connecting member 60 parallel to the flat surface 56, thereby to enable the end sections to assume positions that are determined by the condition of wear of the opposed bearing surfaces of the coupling.

The dimension of the boss section 31 of the coupling between the two end surfaces 43 is determined by the particular dimensions of the arcuate groove 28 of the coupling with which the boss section is to be used, and where this dimension is relatively small, the provision of the arcuate recess 71 and the stud 70 at each end of the boss section 31 may result in a relatively thin wall between the bore 35 and each of the two arcuate recesses 71, and such a condition has been illustrated in the embodiment of the invention shown in Figs. 2 to 10 of the drawings. In the event that the stresses imparted to the elements of the slipper bearing are to be relatively great, such a thin wall section between the bore 35 and the arcuate recess 71 may be eliminated through the provision of longitudinal extensions on the opposite ends of the boss section, and such an embodiment of the invention is illustrated in Figs. 11 and 12 of the drawings. In this alternative embodiment of the invention, the boss section is indicated at 31A, while the end sections are indicated at 40, since such end sections may conform in all major respects with the end section 40 hereinbefore described. The boss section 31A of this embodiment of the invention is formed to afford an arcuate surface 57A and a flat surface 56A, while end abutment surfaces or shoulders 43A are provided for engagement with the side walls 44 of the arcuate recess 28 of a coupling. The boss section 31A of course has a bearing opening 35A formed midway between the two end shoulders 43A, and in accordance with this alternative embodiment of the invention, the boss section 31A has extensions 80 formed along opposite ends so as to increase the overall length of the boss section 31A. These extensions 80 have their lower surfaces formed as extensions of the surface 56A, while the upper surfaces 80A of the extensions 80 are cut downwardly so that when an end section 40 is in position at the end of the boss section 31A, the arcuate surface 47 of the end section will be disposed above the arcuate surface 80A of the extension 80. Thus the arcuate surface 80A of the extension 80 does not function as a bearing surface. In associating the end sections 40 with the boss section 31A, a spacer member 62 of resilient construction is positioned between the end surface of the end section 40 and the end surface of the extension 80, and the boss section is formed to afford a stud 70A adjacent each end thereof so that these studs may be embraced by the connecting members 60. With this arrangement, the stud 70A may be formed with its axis displaced from the axis of the bore 35A in an amount that is greater than the corresponding spacing in the previously described embodiment of the invention. Thus in the formation of each stud 70A, a generally arcuate recess 71A is formed in the boss section adjacent each end thereof, such recess being formed by cutting inwardly through the arcuate surface 57A of the boss section. Through this arrangement, the outer bordering surface of the recesses 71A are spaced outwardly from the bore 35A in such an amount as to leave a wall between each recess 71A and the bore 35A that is much thicker and more substantial than the wall that is afforded in the previously described embodiment of the invention. It will be observed however that all of the advantageous characteristics of the previously described embodiment of the invention are retained in the embodiment shown in Figs. 11 and 12 so that the elements of the slipper bearing may shift relative to each other without the production of undue stresses in the parts of the bearing. It should be observed that when the end sections of the bearing pivot or otherwise shift with relation to the boss section thereof, the movements of the parts do not impose objectionable stresses upon the connector members 60, and hence the life of these members is relatively great.

From the foregoing it will be apparent that the present invention enables slipper bearings to conform with the bearing surfaces of the elements of a coupling without danger of undue stresses or breakage, and hence the useful life of such slipper bearings is materially increased. The slipper bearing construction that is thus afforded by the present invention is of such a character that the end sections of the slipper bearings may readily be removed without disassembly of the bearing, and the end sections may shift and otherwise move or pivot so as to conform with the surfaces of the elements of the coupling. Such desirable functioning of the elements of the slipper bearing is attained under the present invention by means that are rugged in character so that loss of machine time is materially reduced.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims:

I claim:

1. A boss section for use as an element of a multi-element slipper bearing, said boss section comprising a member terminating in opposite end faces and having an arcuate bearing surface and an oppositely facing substantially flat bearing surface, said member having a bearing opening disposed midway between said end surfaces and extended through said member on an axis perpendicular to said flat surface, said member having arcuate clearance openings formed on axes parallel to said first mentioned axis and each opening through one of said end faces and one of said bearing surfaces, and means rigid with said member and affording a pair of anchoring studs located coaxially within the respective clearance openings.

2. A boss section for use as an element of a multi-element slipper bearing, said boss section comprising a member terminating in opposite end faces and having an arcuate bearing surface and an oppositely facing substantially flat bearing surface, said member having a bearing opening disposed midway between said end surfaces and extended through said member on an axis perpendicular to said flat surface, said member having arcuate grooves formed therein adjacent to and opening through each end of the member and each affording a central connecting stud defining the inner wall of the related groove.

3. A boss section adapted to form an element of a multi-element slipper bearing, said boss section comprising a member terminating in opposite end faces and having an arcuate bearing surface and an oppositely facing substantially flat bearing surface, said member having a bearing opening disposed midway between said end faces and extended through said member on the axis perpendicular to said flat surface, said member having a pair of arcuate grooves formed therein so as to open through said arcuate bearing surface, said grooves being disposed adjacent to opposite end faces of said member so as to open through said end faces and define studs disposed in said end faces and parallel to said axis.

4. A boss section for use as an element of a multi-element slipper bearing, said boss section comprising a member terminating in opposite end faces and having an arcuate bearing surface and an oppositely facing substantially flat bearing surface, said member having a bearing opening disposed midway between said end surfaces and extended through said member on an axis perpendicular to said flat surface, said member having arcuate clearance openings formed on axes parallel to said first mentioned axis and each opening through one of said end faces and one of said bearing surfaces, and means rigid with said member and affording a pair of anchoring studs located coaxially within the respective clearance openings and having rounded side surfaces thereon facing toward the axis of said bearing opening.

5. A boss section for use as an element of a multi-element slipper bearing, said boss section comprising a member having an arcuate bearing surface and an oppositely facing substantially flat bearing surface, said member having oppositely facing end shoulders intersecting with said arcuate surface, and said member having extensions projecting beyond said end shoulders, and terminating in end faces parallel to said end shoulders, said member having a bearing opening disposed midway between said end shoulders and extended through said member on the axis perpendicular to said flat surface, said member having a pair of arcuate grooves formed therein so as to open through said arcuate bearing surface, said grooves being disposed adjacent to opposite end faces of said extensions so as to open through said end faces and define studs one of which is disposed in each of said end faces and parallel to said axis.

6. A boss section for use as an element of a multi-element slipper bearing, said boss section comprising a member having an arcuate bearing surface and an oppositely facing substantially flat bearing surface, said member having oppositely facing end shoulders intersecting with said arcuate surface, and said member having extensions projecting beyond said end shoulders, and terminating in end faces parallel to said end shoulders, said member having a bearing opening disposed midway between said end shoulders and extended through said member on an axis perpendicular to said flat surface, said member having a pair of arcuate grooves formed therein adjacent to and opening through the respective end faces of said extensions and each affording a central stud defining the inner wall of the related groove.

7. In a multi-element slipper bearing, a boss section comprising a member terminating in opposite end faces and having an arcuate bearing surface and an oppositely facing substantially flat bearing surface, said member having a bearing opening disposed midway between said end surfaces and extended through said member on the axis perpendicular to said flat surface, said member having a pair of arcuate grooves formed therein so as to open through said arcuate bearing surface and said grooves being disposed adjacent to opposite end faces of said member so as to open through said end faces and define studs disposed in said end faces and parallel to said axis, a pair of end sections disposed respectively at opposite ends of said boss section, each of said end sections comprising a substantially rectangular body having side and end edges and oppositely disposed bearing faces, one of said bearing faces being substantially flat and extended to said side and end edges and the other of said bearing faces extending between said end edges and being arcuate transversely of said side edges and extended thereto, said body having a pair of openings extended therethrough from the end edges thereof, said openings each being formed in cross section so the dimension thereof that is parallel to said flat bearing face is greater than the dimension thereof that is perpendicular to said flat bearing face, a pair of U-shaped connecting members respectively embracing the studs at opposite ends of said boss section and extended through the openings in said end sections, fastening means releasably holding said end sections on said U-shaped connecting members, and resilient means interposed between said end sections and said boss section and acting to urge the end sections outwardly and away from said boss section.

8. In a multi-element slipper bearing, a boss section comprising a member terminating in opposite end faces and having an arcuate bearing surface and an oppositely facing substantially flat bearing surface, said member having a bearing opening disposed midway between said end surfaces and extended through said member on the axis perpendicular to said flat surface, said member having a pair of arcuate grooves formed therein so as to open through said arcuate bearing surface, said grooves being disposed adjacent to opposite end faces of said member so as to open through said end faces and define studs disposed in said end faces and parallel to said axis, a pair of end sections disposed respectively at opposite ends of said boss section, each of said end sections comprising a substantially rectangular body having side and end edges and oppositely disposed bearing faces, one of said bearing faces being substantially flat and extended to said side and end edges and the other of said bearing faces extending between said end edges and being arcuate transversely of said side edges and extended thereto, said body having a pair of openings extended therethrough from the end edges thereof, a pair of U-shaped connecting members respectively embracing the studs at opposite ends of said boss section and extended through the openings in the respective end sections, fastening means releasably holding said end sections on said U-shaped connecting members, and resilient means interposed between said end sections and said boss section and acting to urge the end sections outwardly and away from said boss section.

9. In a multi-element slipper bearing, a boss section comprising a member terminating in opposite end faces and having an arcuate bearing surface and an oppositely facing substantially flat bearing surface, said member having a bearing opening disposed midway between said end surfaces and extended through said member on the axis perpendicular to said flat surface, said member having a pair of arcuate grooves formed therein so as to open through said arcuate bearing surface, said grooves being disposed adjacent to opposite end faces of said member so as to open through said end faces and define studs disposed in said end faces and parallel to said axis, a pair of end sections disposed respectively at opposite ends of said boss section, each of said end sections comprising a substantially rectangular body having side and end edges and oppositely disposed bearing faces, one of said bearing faces being substantially flat and extended to said side and end edges and the other of said bearing faces extending between said end edges and being arcuate transversely of said side edges and extended thereto, connecting members secured to each of said end sections and each embodying an arcuate portion extending beyond the ends of said end sections and respectively embracing the studs at opposite ends of said boss section, and resilient means interposed between said end sections and said boss section and acting to urge the end sections outwardly and away from said boss section.

10. In a multi-element slipper bearing, a boss section comprising a member terminating in opposite end faces and having an arcuate bearing surface and an oppositely facing substantially flat bearing surface, said member having a bearing opening disposed midway between said end surfaces and extended through said member on the axis perpendicular to said flat surface, means affording a pair of studs disposed respectively at the opposite ends of said boss and parallel to said axis, a pair of end sections disposed respectively at opposite ends of said boss section, each of said end sections comprising a substantially rectangular body having side and end edges and oppositely disposed bearing faces, one of said bearing faces being substantially flat and extended to said side and end edges and the other of said bearing faces extending between said end edges and being arcuate transversely of said side edges and extended thereto, said body having a pair of openings extended therethrough from the end edges therof, a pair of U-shaped connecting members respectively embracing the studs at opposite ends of said boss section and extended through the openings in said end sections, fastening means releasably holding said end sections on said U-shaped connecting members, and resilient means interposed between said end sections and said boss section and acting to urge the end sections outwardly and away from said boss section.

11. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at medial parts thereof to form an arcuate groove, the combination of a pair of slipper bearings respectively disposed in the arcuate recesses and including central boss sections located within said groove and separately formed end sections having convex faces to conform with and bear against other portions of said arcuate recesses and also having flat faces respectively disposed toward and bear against opposed flat faces of said tongue, a bearing pin extended through the opening in said tongue and into the medial parts of said bearings, said boss sections each having arcuate grooves formed therein adjacent to and opening through opposite ends of such boss sections to define a stud at each end of each boss section, means including arcuate members secured to each end section and embracing the adjacent one of said studs to secure the respective end sections to the boss sections, and resilient means disposed between said bosses and end sections and operable to urge said end sections toward a predetermined relation with respect to said bosses.

12. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at medial parts thereof to form an arcuate groove, the combination of a pair of slipper bearings respectively disposed in the arcuate recesses and including central boss sections located within said groove and separately formed end sections having convex faces to conform with and bear against other portions of said arcuate recesses and also having flat faces respectively disposed toward and bear against opposed flat faces of said tongue, a bearing pin extended through the opening in said tongue and into the medial parts of said bearings, means affording anchoring studs disposed at opposite ends of each of said boss sections and parallel to said bearing pin, and means secured to each of said end sections and embracing the adjacent one of said anchoring studs to hold said end sections in position on said boss sections.

JOSEPH S. DUFFY.

REFERENCES CITED

The following references are of record in the file of this patent:

UNITED STATES PATENTS

| Number | Name | Date |
|---|---|---|
| 2,305,698 | Irvin | Dec. 22, 1942 |